United States Patent [19]

Yokoi

[11] Patent Number: 4,660,056

[45] Date of Patent: Apr. 21, 1987

[54] LIQUID JET RECORDING HEAD

[75] Inventor: Katsuyuki Yokoi, Sagamihara, Japan

[73] Assignee: Canon Kabushiki Kaisha, Tokyo, Japan

[21] Appl. No.: 714,518

[22] Filed: Mar. 21, 1985

[30] Foreign Application Priority Data

| | | | |
|---|---|---|---|
| Mar. 23, 1984 | [JP] | Japan | 59-54350 |
| Mar. 23, 1984 | [JP] | Japan | 59-54351 |
| Mar. 23, 1984 | [JP] | Japan | 59-54352 |
| May 8, 1984 | [JP] | Japan | 59-90211 |

[51] Int. Cl.[4] .......................... G01D 15/18; B41J 3/20

[52] U.S. Cl. .................................. 346/140 R; 400/126

[58] Field of Search ....................... 346/76 PH, 140 R; 400/126

[56] References Cited

U.S. PATENT DOCUMENTS

| | | | |
|---|---|---|---|
| 4,125,845 | 11/1978 | Stevenson, Jr. | 346/140 R |
| 4,317,124 | 2/1982 | Shirato et al. | 346/140 R |
| 4,345,262 | 8/1982 | Shirato et al. | 346/140 R |
| 4,386,360 | 5/1983 | Murayama et al. | 346/76 PH |
| 4,504,845 | 3/1985 | Kattner et al. | 346/140 R |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A liquid jet recording device is provided with a head unit having a liquid pathway having an outlet for forming flying droplets by discharging liquid at the tip portion thereof and an energy generating member provided along the liquid pathway. The device comprises a temperature detecting means provided in a part of the head unit and a heating means, which is controlled by the detection signal from the temperature detecting means and has a larger effective heating area than the bottom area of the head unit, provided on the bottom portion of the head unit. The head unit may be provided with an air chamber in a part of said head unit, a temperature sensor provided in said air chamber and a heater. The head unit may be fixed at the heating means side to a carriage, which comprises an air layer provided between said heating means and the carriage. The head unit may comprise a head cover provided in at least a part of said liquid jet recording head and has an air layer between said head cover and said head.

4 Claims, 13 Drawing Figures

LIQUID JET RECORDING HEAD

BACKGROUND OF THE INVENTION

1. Field of the Invention

This invention relates to a liquid jet recording head and device, and more particularly to a liquid jet recording head and device having a liquid heating means in a recording head.

2. Description of the Prior Art

FIG. 1 shows a schematic illustration of a liquid jet recording device of the prior art.

In this Figure, the member denoted by the numeral 101 is a head unit having a built-in liquid jet recording head, which performs recording on the paper 104 by discharging flying droplets of a liquid such as ink fed through a tube 103 from a main tank 102.

The member shown by the numeral 105 is a discharge restoration pump which is used when droplet discharging becomes incomplete or interrupted, and the pump 105 performs restoration of discharging actuation by sucking liquid from an orifice not shown within the head unit through a tube 106. During this sucking operation, the liquid within the head unit 101 is also sucked through a tube 107.

The sucked liquid is led to a waste liquor reservoir 108 to be stored therein.

The cap shown by the numeral 109 is provided for preventing the liquid within the head unit 101 from drying or from contamination by impurities such as dust when liquid jet recording is not performed over a long term or during transportation of the device, and it is fitted to the tip portion of the head unit 101.

The member designated by the numeral 110 is a carriage on which the head unit 101 is mounted, the numeral 111 showing a platen.

A liquid jet recording device having such a structure is finding wide use, since it generates less noise as compared with an impact device such as a wire dot recording device, and yet requires no post-recording treatment such as fixing.

The liquid jet recording devices of this kind may be classified into two kinds of an on-demand type and a continuous type.

The on-demand type device is a system, in which droplets are discharged only when a recording command is received, while the continuous type device is a system in which droplets are discharged continuously at a constant frequency and an electrical field applied on the space through which the droplets are flying is changed in response to the recording command, thereby changing the route of the droplets to effect recording, while recovering and circulating the droplets not concerned with recording.

The on-demand type device has the advantage of being, simpler in structure than the continuous type.

On the other hand, the liquid to be used for recording undergoes changes in physical properties such as viscosity or surface tension depending on the temperature, and the sizes of droplets discharged change depending on temperature changes, even when the same energy is generaed by an energy generating member such as piezoelectric element of the droplet forming means. As a result, the recorded dots on the recording paper are changed in size to give unstable recording quality or image quality depending on the conditions of use of the device. This is a great obstacle in obtaining recording of high quality.

For overcoming such drawback, attempts have been made to provide a means for detecting the temperature of the environment under which the device is placed or of the droplet forming means so as to compensate temperature changes by heating a part or whole of the droplet forming means through the signals sent from such a detecting means, thereby keeping constant the temperature of the droplet forming means.

FIG. 2 shows an example of the prior art having such a structure.

In the example shown in FIG. 2, the head unit 101 is constructed of a multi-orifice type having a plurality of outlets 112.

The outlets 112 are formed at the tip ends of the liquid pathways 113, each liquid pathway 113 being housed at the bottom within the liquid reservoirs 114 partitioned independently of each other.

The respective liquid reservoirs 114 are fed with liquids such as ink with the same color or different colors.

At the bottoms of the respective liquid reservoirs 114, heating means 115 in the form of a flat plate are fixed.

In the vicinity of the outlets 112 in the liquid pathways 113, energy generating members such as piezoelectric elements are mounted along the liquid pathways.

A temperature detecting means is mounted at either one of the liquid reservoirs selected to perform temperature compensation by heating with the heating means 115 to keep the liquid at a constant temperature.

In such a construction, in order that all of the plural number of droplet forming sections may be heated with uniform watt density, the portions to be heated of the respective droplet forming sections, namely the areas at the back face of the respective liquid reservoirs are made equal and the effective area on the heating surface of the heating means 115 is also made equal to the total sum of the areas of the portions to be heated of the respective droplet forming sections.

However, with such a structure as mentioned above, when the difference between the temperature controlled by temperature compensation and the environmental temperature is great, dissipation of heat from the portions other than the portions to be heated of the droplet forming sections, namely the portions at the upper faces or four side faces of the liquid reservoirs 114 which contact the air, becomes great, and the temperature of the droplet forming sections at both ends with greater areas contacting the air becomes lower than the temperature of the droplet forming selections located inside of the device.

Thus, temperature compensation cannot effectively performed which can cause marked lowering in recording quality or image quality such as different sizes of recorded dots for respective orifices.

On the other hand, in a structure as shown in FIG. 2, the tip end of the temperature sensor 117 is inserted into the liquid, and at least a part of the temperature sensor is formed of a metal, and in most cases an appropriate voltage is applied for detection of the temperature.

Also, since a dye which is an electrolyte is employed in the liquid such as ink for the purpose of coloration, there was involved the drawback that electrolytic dissolution occurs at the metal portion of the temperature sensor on prolonged usage, whereby the device can no longer be used.

Accordingly, an attempt has been made to coat the surface of the temperature sensor with a fluorine resin or the like to prevent the dissolution, but this method leads a corresponding increase in cost.

A structure as shown in FIG. 3 has been proposed for alleviating these drawbacks.

In the example shown in FIG. 3, in order to avoid electrolytic dissolution of the temperature sensor 117, an detection piece 118 is provided at the side of the head unit 101 and the temperature sensor 117 is provided on the detection piece.

The temperature sensor 117 detects the environmental temperature under which the device is set on initial actuation of the device, and gives heat quantity corresponding to this temperature to the liquid through the heater 115.

However, when such a structure is employed, since the liquid temperature is not detected directly, there is involved the drawback that accurate temperature compensation in real time is not possible.

As another drawback, the head unit 101 with a structure as shown in FIG. 2 has a projection 101*a* as shown in FIG. 4 and fixed by screwing onto the carriage 110 through the projection 101*a*.

Whereas, by employment of such a mounting structure, the heat of the heating means will escape toward the carriage 110, whereby the heat unit 101 and the carriage 110 are regarded as one body, with the disadvantageous result that it will take a long time before reaching the target control temperature even if the device may be actuated to actuate the temperature compensating circuit, thereby making the waiting time of the device longer.

SUMMARY OF THE INVENTION

The present invention has been accomplished to eliminate the drawbacks of the prior art as described above, and a primary object of the invention is to provide a liquid jet recording head and device capable of performing recording of high image quality and high quality without being influenced by the environmental temperature under which the device is placed.

Another object of the present invention is to provide a liquid jet recording head and device which are constructed so as to be capable of recording of high quality by giving good temperature compensation to the liquid with good precision at real time, thereby maintaining constantly the temperature of the liquid.

Still another object of the present invention is to provide a liquid jet recording head which is constructed so as to give a short waiting time by temperature compensation and involve no superfluous generation of heat by heat generating means.

A further object of the present invention is to provide a liquid jet recording head comprising a multi-nozzle head provided with a plurality of flying droplet forming means, which enables controlling uniformly the temperature distribution between the respective flying droplet forming means heated, thereby giving good quality of printed letters.

According to one aspect of the present invention, there is provided a liquid jet recording device, provided with a head unit having a liquid pathway having an outlet for forming flying droplets by discharging liquid at the tip portion thereof and an energy generating member provided along the liquid pathway, which comprises a temperature detecting means provided in a part of the head unit and a heating means, which is controlled by the detection signal from the temperature detecting means and has a larger effective heating area than the bottom area of the head unit, provided on the bottom portion of the head unit.

According to another aspect of the present invention, there is provided a liquid jet recording head, provided with a head unit having a liquid pathway located in a liquid reservoir having an outlet for forming flying droplets by discharging liquid at the tip portion thereof and an energy generating member provided along the liquid pathway, which comprises an air chamber provided in a part of said head unit, a temperature sensor provided in said air chamber and a heater, which is provided on the bottom face of the head unit, and generates heat by the signal from the temperature sensor.

According to still another aspect of the present invention, there is provided a liquid jet recording device, provided with a head unit having a liquid reservoir for housing a liquid for recording a liquid pathway of which one end side is inserted into said liquid reservoir and the other end side has an outlet formed for discharging the liquid to form flying droplets, an energy generating member provided along the liquid pathway, a temperature detecting means provided in a part of said liquid reservoir and a heating means which is controlled in temperature by the detected signal from the temperature detecting means, said head unit being fixed at the heating means side to a carriage, which comprises an air layer provided between said heating means and the carriage.

According to further aspect of the present invention, there is provided a liquid jet recording head, having an orifice provided for formation of flying droplets, a liquid pathway for supplying to said orifices, an energy generating member provided along said liquid pathway and utilized for formation of said droplets, and a liquid reservoir provided upstream of said liquid pathway, a means for heating the liquid and a means for detecting the temperature of the liquid, which comprises a head cover provided in at least a part of said liquid jet recording head and has an air layer between said head cover and said head.

DETAILED DESCRIPTION OF PREFERRED EMBODIMENTS

Figure 1:
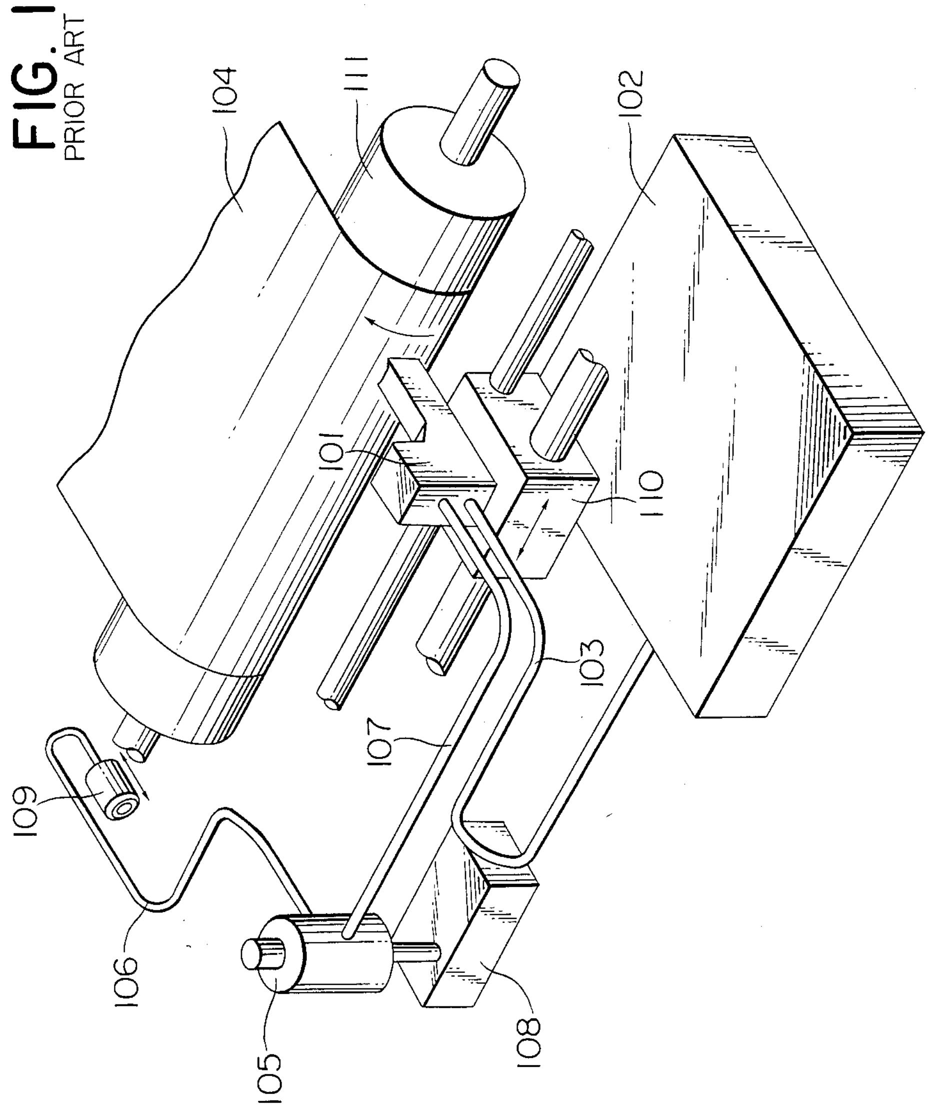
FIG. 1 PRIOR ART
FIG. 1 through FIG. 4 are schematic illustrations of the structures of the prior art, FIG. 1 showing a perspective view of a liquid jet recording device, FIG. 2 a perspective view of a head unit of the prior art, FIG. 3 a schematic front view of another head unit, and FIG. 4 a schematic perspective view for illustration of an example of the prior art in mounting the head unit of the prior art on a carriage.
Figure 2:
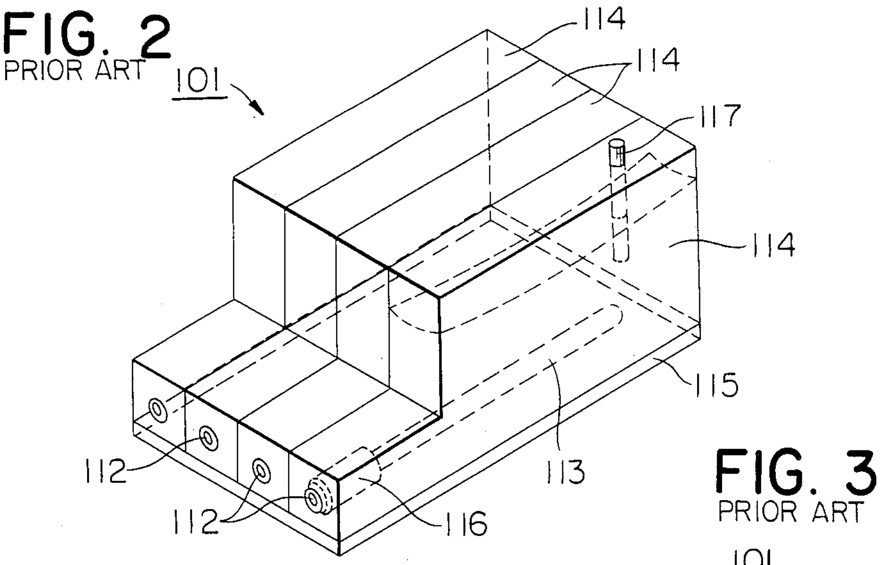
FIG. 2 PRIOR ART
Figure 3:
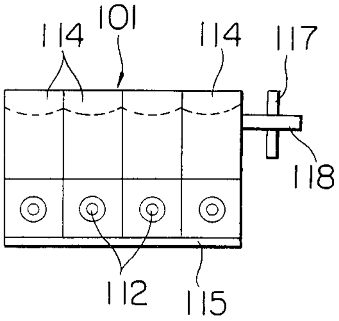
FIG. 3 PRIOR ART
Figure 4:
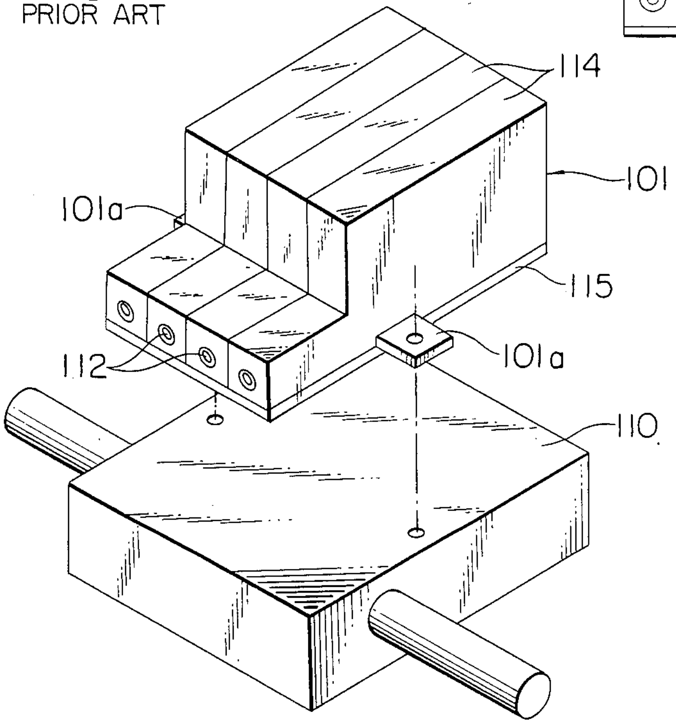
FIG. 4 PRIOR ART

The present invention is described in detail below by referring to the embodiments as shown in the drawings.

Figure 5:
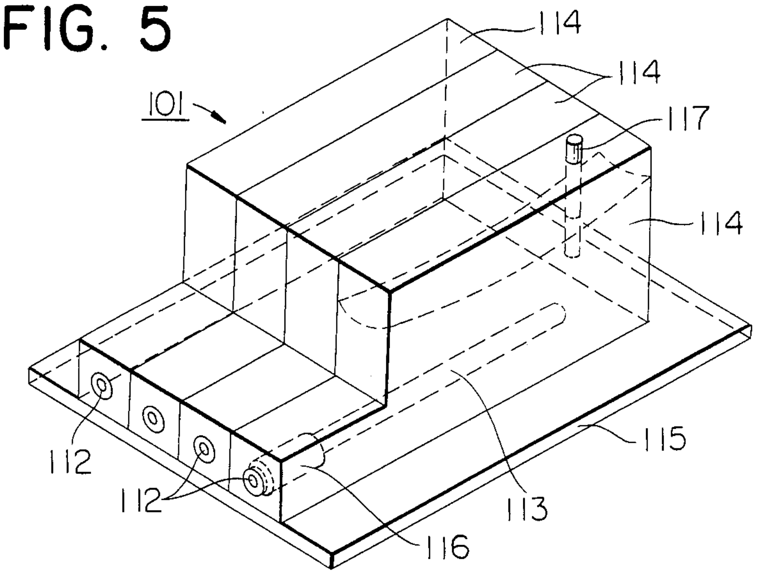
FIG. 5 is a perspective view for illustration of a first embodiment of the present invention.

FIG. 5 shows a first embodiment which can accomplish the objects of the present invention.

In this embodiment, the heating means 115 is made to have a greater heating area than the bottom area of the head unit 101, and there is a portion of the heating means which contacts the outside air around the head unit 101.

Since this embodiment is constructed as described above, even if the difference between the controlled temperature for compensation and the environmental temperature in which the device is placed becomes greater and connection of the outside air may occur at the contact surface of the head unit 101 with the outside air, the air heated by the heating means 115 covers the side surface of the head unit 101 so that the heat will not be dissipated from this portion.

Thus, the plural liquid reservoirs 114 can be controlled substantially uniformly in temperature, and high quality recording is achievable independently of the environmental temperature.

As the heating means 115, there may be employed a heater in which a heat generating meaterial is patternized by means of etching, etc., sealed with a heat-resistant material such as silicon rubber, etc. and an electroconductive wire is laminated with a heat-resistant film, etc.

As the temperature detecting means, there may be employed a thermocouple, for example, a heat-sensitive resistant element such as Posister (trade name: produced by Murata Seisakusho).

Although the temperature detecting means is shown in the illustration as being inserted into the liquid reservoir 114, it can also be provided outside the liquid reservoir.

According to the embodiment as shown in FIG. 5, since the heating means for temperature compensation is formed to have greater effective area than the bottom area of the head unit 101, the whole of the head unit 101 can be heated uniformly, whereby the temperature compensation of the liquid can be conducted accurately irrespectively of the change in environmental temperature to enable recording of high quality.

Figure 6:
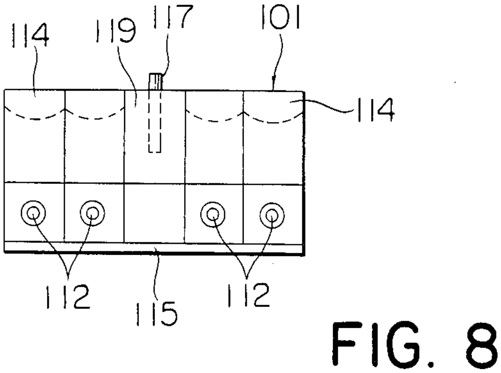
FIGS. 6 through 8 are a front view, a plan view and a side view for illustration of the head unit of a second embodiment of the present invention, respectively.
Figure 7:
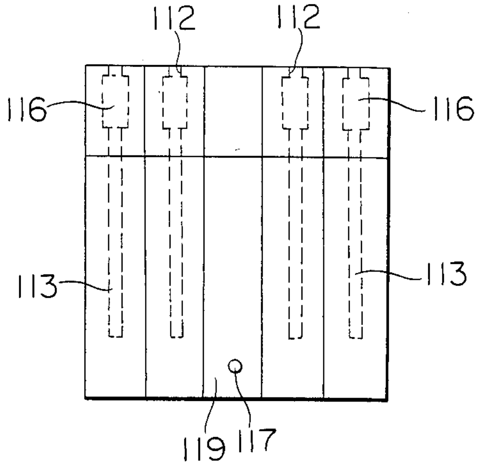
Figure 8:
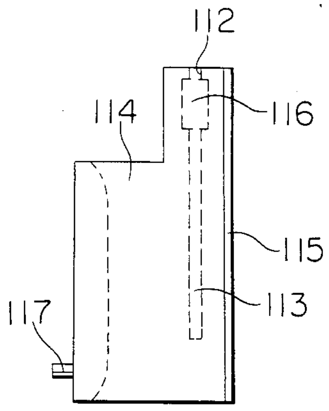

FIG. 6 through FIG. 8 illustrate a second embodiment which can accomplish the objects of the invention, and the same numerals are given to the same or corresponding portions as in FIG. 1 through FIG. 4, and explanations thereabout are omitted.

In this embodiment, an air chamber 119 containing no liquid is provided between the plural number of liquid reservoirs, and a temperature sensor 117 is inserted into the air chamber 119.

By employment of such a structure, the temperature sensor is kept away from direct contact with the liquid and therefore electrolytic dissolution can be avoided and the treatment with a fluorine type resin, etc. is not required on its surface.

On the operation of the recording device with the construction described above, the temperature of the recording head is detected by the temperature sensor 117, and the heater 115 is actuated in response to its signal to heat the whole head unit.

On the other hand, the whole of the head unit 101 inclusive of the air chamber 119 may be considered as one heat capacitor and therefore the temperature in the air chamber will be shifted similarly as the temperature of the liquid for forming droplets.

Accordingly, it is possible to control temperature compensation with good precision at real time.

The temperature sensor 117 may be mounted other than at the central portion of the head unit.

As is apparent from the above description, in the embodiment as shown in FIG. 6 through FIG. 8, due to a structure having a temperature sensor provided in the air chamber formed in a part of the head unit, it is possible to perform temperature compensation with good precision at real time for the liquid to given high recording quality.

Figure 9:
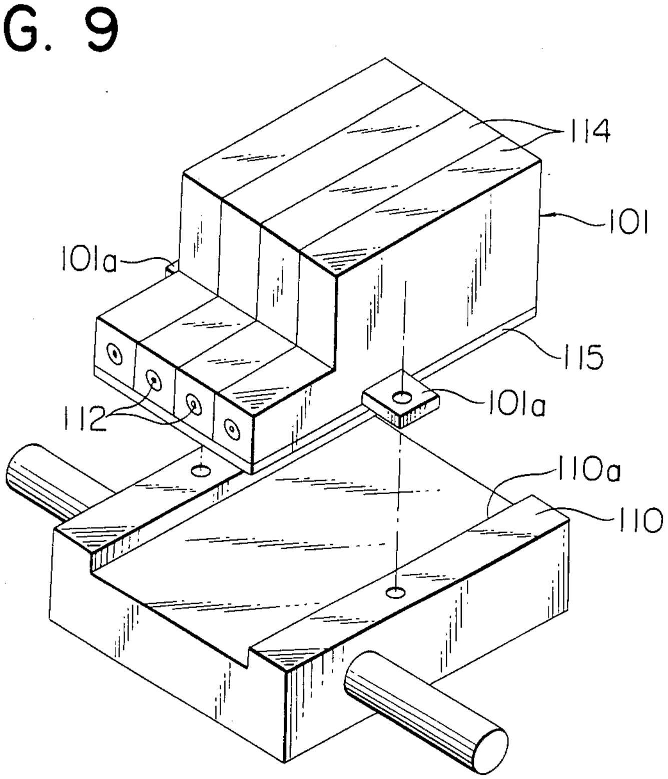
FIG. 9 and FIG. 10 are given for illustration of a third embodiment of the present invention, FIG. 9 showing an exploded perspective view and FIG. 10 a front view in an assembled state.
Figure 10:
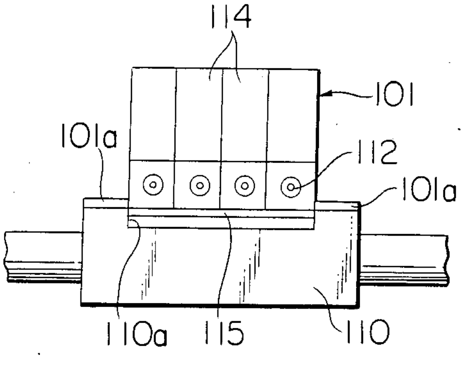

FIG. 9 and FIG. 10 illustrate a third embodiment which can accomplish the objects of the invention, and the same numerals are given to the same or corresponding portions in FIG. 1 through FIG. 4 without explanations thereabout.

In this embodiment, a recess portion 110*a* having substantially the same area as the heating means 115 is formed on the upper surface of the carriage and at the portion where the head unit 101 is to be fixed.

The head unit 101 is mounted through the projected piece 101*a* so that the heating means 115 may be located above the recess portion 110*a*, as shown in FIG. 10.

When mounted in such a manner, an air layer is formed by the recess portion 110*a* beneath the heating means 115, the air layer insulating heat transfer to the carriage 110, and the heat generated by the heating means 115 being used only for elevation of temperature of the head unit 101. Consequently, the target control temperature for temperature compensation can rapidly be achieved to make waiting time shorter without loss time.

In the above embodiment, the recess portion is provided on the carriage side, but it is also possible to provide a recess portion at the bottom of the head unit 101 and a heating means may be provided in said recess portion.

As is apparent from the above description, according to the embodiment shown in FIG. 9 and FIG. 10, by employment of a structure wherein an air layer is provided between the heating means provided at the lower surface of the head unit and the carriage at which the head unit is to be provided, the heat generated by the heating means is used for heating the head unit without heat loss toward the carriage side, whereby the target temperature for temperature compensation can rapidly be reached to make waiting time shorter.

Figure 11:
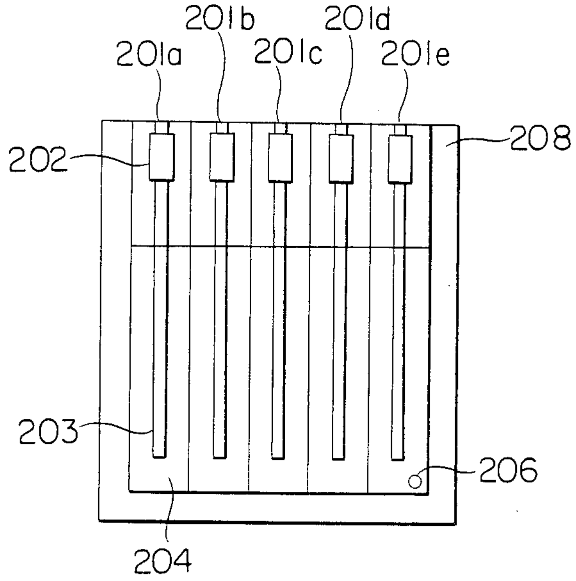
FIGS. 11 through 13 are given for illustration of a fourth embodiment of the liquid jet recording head of the present invention, FIG. 11 showing a schematic plan view, FIG. 12 a schematic front view as viewed from the outlet side and FIG. 13 a schematic side view, respectively.
Figure 12:
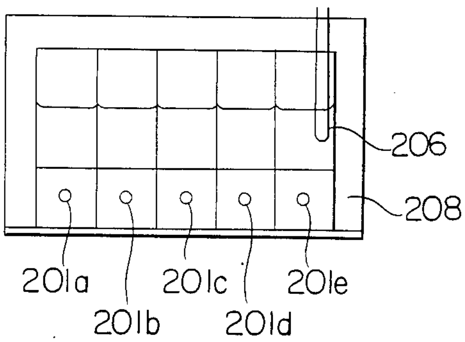
Figure 13:
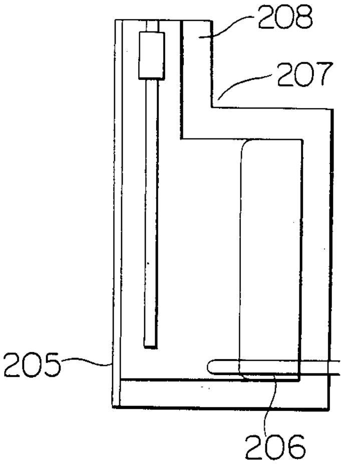

FIG. 11 through FIG. 13 illustrate a fourth embodiment which can accomplish the objects of the invention.

FIG. 11 is a schematic plan view, FIG. 12 a schematic front view as viewed from the outlet side, and FIG. 13 a schematic side view for illustration thereof.

In FIG. 11, FIG. 12 and FIG. 13, 201*a*, 201*b*, 201*c*, 201*d* and 201*e* are each on outlet provided for forming flying droplets, 203 is a liquid pathway for supplying liquid to said orifices, 202 is an energy generating member provided for generating energy for formation of discharged droplets, 204 is a liquid reservoir provided upstream of said liquid pathway 203 for storing the liquid discharged. In the embodiment shown in FIG. 11 through FIG. 13, the principal portion of the flying droplet forming means is substantially constituted of the above outlets 201*a*–201*e*, the liquid pathway 203, the energy generating member 202 and the liquid reservoir 204. As shown in FIG. 11, a plurality of said flying droplet forming means are provided. As shown in FIG. 11, a heater 205 is provided as a means for heating the liquid for forming flying droplets below the abovementioned flying droplet forming means. As shown in FIG. 11 thorugh FIG. 13, a temperature sensor 206 is provided as the means for detecting the temperature of liquid upstream of the liquid pathway. On at least a part of the surface other than the part having the above outlets 201*a*–201*e* provided thereon and the surface having the above heater 205 provided thereon, an air layer 208 formed by said surface and the head cover 207 is provided, said air layer 208 being located so as to be heated by the heater 205 at the same heat density as the flying droplet forming means. That is, during temperature control, the head body which is the aforesaid droplet forming means is constructed so as to be surrounded by the air layer 208 of substantially the same temperature as the head body. The head cover 207 is made of a material of low thermal conductivity such as a plastic, etc. and the thickness of the air layer 208 formed between the head cover 207 and the head body is made thin, generally desirably 10 mm or less. Table 1 shows the temperatures of the ink in the respective droplet forming means in the prior art example having no air layer 208 and the liquid jet recording head of the present invention, when the control temperature is made 50° C. at an environmental temperature of 5° C.

TABLE 1

Ink temperature at various positions of droplet forming means in the respective heads when temperature control is conducted (control temperature: 50° C.)

| Position of droplet forming means | a | b | c | d | e |
|---|---|---|---|---|---|
| Head of the prior art: | 49 | 55 | 58 | 55 | 49 |
| Head of the invention: | 49 | 50 | 50 | 50 | 49 |

As can be seen in Table 1, according to the liquid jet recording head as shown in FIG. 11 through FIG. 13, there is no occurrence of heat loss by the air convection with cold outer air on the surface of the head body, which has been the case for nonuniform temperature distribution in the liquid jet recording head of the prior art provided with a plurality of flying droplet forming means, and heat exchange of the head body is effected only with the air layer 208 heated to the temperature substantially equal to the main body, whereby the nonuniform temperature between the respective flying droplet forming means can be substantially avoided. Further, the recorded dots formed recording medium by the outlet 201*c* located at the central portion of the head and by the outlets 201*a* and 201*e* have substantially equal sizes and accordingly good printed letter quality can be given to provide a good recorded product.

According to the liquid jet recording head of the fourth embodiment of the present invention, by forming an air layer surrounding the head body which is the above-mentioned flying droplet forming means and locating the above-mentioned heating means so as to heat uniformly not only the head body but also the air layer, the temperatures of the respective outlets can be controlled uniformly to perform good recording.

What I claim is:

1. A liquid jet recording device, comprising:

a recording head unit having a bottom with a peripheral boundary, said head unit including a liquid pathway having an outlet for forming flying droplets by discharging liquid at the tip portion thereof and an energy generating member provided along said liquid pathway;

temperature detecting means in a part of said head unit for detecting the temperature of the liquid; and heating means controlled by a detection signal from said temperature detecting means for generating heat to heat the liquid, said heating means being attached to said bottom of said head unit and having at least a portion extending beyond at least a portion of the peripheral boundary of said bottom of said head unit.

2. A liquid jet recording head comprising:

a plurality of recording head units, each including a liquid pathway leading from a liquid reservoir to an outlet for forming flying droplets by discharging liquid at the tip portion thereof, an energy generating member provided along said liquid pathway, and an air chamber between two of of said head units;

a temperature sensor in said air chamber for sensing the temperature of the liquid; and a heater provided on a face of said head unit for generating heat to heat the liquid in response to a signal from said temperature sensor.

3. A liquid jet recording device comprising:

a recording head unit, including a liquid reservoir for housing a liquid for recording, a liquid pathway of which one end is inserted into said liquid reservoir and the other end has an outlet for discharging the liquid to form flying droplets, and an energy generating member provided along said liquid pathway;

temperature detecting means in a part of said liquid reservoir for detecting the temperature of liquid therein; and heating means controlled by a signal from said temperature detecting means for generating heat to heat the liquid, wherein said head unit is fixed to a carriage with an air layer between said heating means and the carriage.

4. A liquid jet recording device according to claim 1, further comprising: a head cover mounted on said head unit to provide an air layer between said head cover and said head unit.

* * * * *

UNITED STATES PATENT AND TRADEMARK OFFICE

CERTIFICATE OF CORRECTION

PATENT NO. : 4,660,056
DATED : April 21, 1987
INVENTOR(S) : KATSUYUKI YOKOI, ET AL.

It is certified that error appears in the above-identified patent and that said Letters Patent is hereby corrected as shown below:

COLUMN 1

Line 27, "liquor" should read --liquid--.
Line 46, "system, in" should read --system in--.
Line 58, "being, simpler" should read --being simpler--.
Line 62, "of droplets" should read --of the droplets--.
Line 64, "generaed" should read --generated--.

COLUMN 2

Line 55, "performed which" should read --be performed, which--.

COLUMN 3

Line 4, "leads a" should read --leads to a--.
Line 9, "an" should read --a--.
Line 48, "constantly" should read --constant--.

COLUMN 4

Line 31, "to further" should read --to a further--.

COLUMN 5

Line 20, "connection" should read --convection--.
Line 37, "resistant" should read --resistance--.

COLUMN 6

Line 17, "given" should read --give--.
Line 62, "on" should read --an--.

UNITED STATES PATENT AND TRADEMARK OFFICE

CERTIFICATE OF CORRECTION

PATENT NO. : 4,660,056 Page 2 of 2

DATED : April 21, 1987

INVENTOR(S) : KATSUYUKI YOKOI, ET AL.

It is certified that error appears in the above-identified patent and that said Letters Patent is hereby corrected as shown below:

COLUMN 7

Line 10, "thorugh" should read --through--.
Line 49, "for nonuniform" should read --for the nonuniform--.
Line 58, "formed" should read --formed on the--.

COLUMN 8

Line 34, "of of" should read --of--.
Line 57, ":" should be deleted.

Signed and Sealed this

First Day of September, 1987

*Attest:*

DONALD J. QUIGG

*Attesting Officer* *Commissioner of Patents and Trademarks*